(12) United States Patent
Enya et al.

(10) Patent No.: US 7,268,677 B2
(45) Date of Patent: Sep. 11, 2007

(54) INFORMATION PROCESSING SYSTEM (75) Inventors: Takeshi Enya, Nagoya (JP); Ryoichi Sugawara, Nagoya (JP); Toshiyuki Morishita, Nagoya (JP)

(73) Assignee: DENSO CORPORATION, Kariya (JP)

( * ) Notice: Subject to any disclaimer, the term of this patent is extended or adjusted under 35 U.S.C. 154(b) by 295 days.

(21) Appl. No.: 11/139,632

(22) Filed: May 31, 2005

(65) Prior Publication Data

US 2005/0270146 A1 Dec. 8, 2005

(30) Foreign Application Priority Data

Jun. 7, 2004 (JP) .............................. 2004-168780

(51) Int. Cl.
*B60Q 1/00* (2006.01)
(52) U.S. Cl. .................. 340/438; 340/435; 340/384.1; 381/86; 455/556.2
(58) Field of Classification Search ................ 340/438, 340/435, 436, 437, 902, 903, 384.1; 381/86, 381/59, 102, 103, 79; 455/556.1, 556.2, 455/557; 701/301
See application file for complete search history.

(56) References Cited

U.S. PATENT DOCUMENTS

| | | | |
|---|---|---|---|
| 6,339,369 B1 * | 1/2002 | Paranjpe | ..................... 340/436 |
| 6,470,273 B2 * | 10/2002 | Halsted et al. .............. 701/301 |
| 6,759,948 B2 * | 7/2004 | Grisham et al. ............ 340/435 |
| 7,049,945 B2 * | 5/2006 | Breed et al. ................. 340/435 |
| 7,187,947 B1 * | 3/2007 | White et al. ............. 455/556.1 |
| 2003/0043029 A1 | 3/2003 | Ichikawa et al. | |

FOREIGN PATENT DOCUMENTS

| | | |
|---|---|---|
| JP | A-11-318000 | 11/1999 |
| JP | A-2002-133596 | 5/2002 |
| JP | A-2002-293165 | 10/2002 |
| JP | A-2003-32776 | 1/2003 |

OTHER PUBLICATIONS

Ohta et al. "Sound system and digital signal processing", Institute of Electronics, Information and Communication Engineers, pp. 231-242, Mar. 1995.

* cited by examiner

*Primary Examiner*—Davetta W. Goins
(74) *Attorney, Agent, or Firm*—Posz Laws Group, PLC (57) ABSTRACT

An information processing system for use in a vehicle includes a main body for various operations and a portable device in data communication with the main body. The portable device is installed in front of a seat, and has a speaker system for outputting an audible signal. A virtually created source of the audible signal whose location or direction relative to the driver and other occupants of the vehicle is identified by the information processing system. A sound field localization based on a data processing for the audible signal makes the sound signal heard from the identified direction. Perception of the audible signal from the virtually created source of the audible signal facilitates awareness of a surrounding environment of the vehicle.

42 Claims, 10 Drawing Sheets

INFORMATION PROCESSING SYSTEM

CROSS REFERENCE TO RELATED APPLICATION

This application is based on and claims the benefit of priority of Japanese Patent Application No. 2004-168780 filed on Jun. 7, 2004, the disclosure of which is incorporated herein by reference.

FIELD OF THE INVENTION

The present invention relates to an information processing system for use in a vehicle and, more specifically to an information processing system with a handheld information terminal.

BACKGROUND OF THE INVENTION

An automotive system such as a car stereo system, a navigation system or the like conventionally uses a sound effect to transfer information necessary for driving from the system to a driver of the vehicle.

For example, voice guidance from the navigation system and warning from various kinds of sensors and detectors on the vehicle to inform an obstacle on a road, abnormality in the vehicle or the like are output by using the sound effect for putting the driver in a precautionary state for appropriate operation (refer to Japanese Patent Document JP-A-2002-133596).

However, the sound effect for warning or the like does not necessarily serves as precautions when the driver is not well prepared to distinguish types of sound effects and does not know how to handle a situation by operating the vehicle properly without delay. For example, ultrasound sensors for obstacle detection disposed on four corners of the vehicle do not serve the driver properly when the warning sound effect of the sensor does not draw the driver's attention in an appropriate manner, that is, when the warning sound effect does not turn the driver's attention to a corner of the vehicle that is approaching an obstacle.

SUMMARY OF THE INVENTION

In view of the above-described problems, it is an object of the present invention to provide an information processing system that provides necessary information for a driver of a vehicle, such as a perception of direction from which an object is approaching, without delay by using a sound effect processed in the system.

The information processing system includes a main body for various operations and a portable device in data communication with the main body. The portable device is installed with its axis of symmetry aligned with an axis of symmetry of a seat in the vehicle, and is equipped with a speaker system for outputting a sound from a virtual sound source. The virtual sound source in this case means a presumed location of a sound source. That is, the sound comes to a listener from a direction in which there is no real sound source such as a speaker or the like but the virtual sound source created by a sound image localization method.

The portable device is in a position that the axis of symmetry of the device aligned with an extension of the axis of symmetry of the seat. The speaker system of the portable device is used for outputting the sound from the virtual sound source. Therefore, attention of the driver is immediately attracted to the virtual sound source, or in a direction of the virtual sound source, because a warning sound or the like can be heard by the driver from the direction of the virtual sound source that is determined by the information processing system.

In this case, a processing function of the sound image localization method such as a stereo dipole method or the like for creating the virtual sound source may be executed either on the information processing system side or on the portable device side.

The information processing system further includes a display on the portable device for clearly showing a direction of attention in addition to creating the virtual sound source. That is, the portable device turns the driver's attention to the warning sound being heard in the direction of attention more specifically by showing information on the display.

In this case, a cellular phone, a personal digital assistant (PDA), a digital stereo sound device or the like may be used as the portable device.

The portable device and the main body of the information processing system communicate with each other by using a wired communication or a wireless communication.

The portable device of the present invention further includes a camera and/or a microphone. The camera may capture an image of the driver, and the microphone may capture driver's voice as an input for the information processing system.

The portable device has an operator side face that is equipped with the speakers, the display, the camera, and the microphone. More specifically, the operator side face of the portable device has, for example, sound output devices of the speaker system, an image output device of the display, a lens of the camera and a sound input device of the microphone. In this manner, the portable device can effectively output an image and a sound, and can effectively input an image and a sound.

The portable device of the present invention may be installed for use in an operator in a driver's seat, a passenger seat, second left and right seats and third left and right seats. The portable devices may be installed in front parts of those seats for use by the operator in each seat. That is, the axis of symmetry of the portable device is aligned with the axis of symmetry of each seat.

The portable device may be installed on a meter portion, on an upper part of an instrument panel, on an upper part of a steering column or on a visor. The installation position of the portable device may be in a proximity of driver's knee, or in a proximity of driver's head, when the portable device only outputs sound. The installation position of the portable device is not bound by restriction on driver's eye movement when the device uses sound only.

The portable devices may be installed on the front parts of the six seats in the vehicle, that is, the driver's seat, the passenger seat, the second left and right seats, and the third left and right seats at the same time with their symmetry axes aligned with each of those seats. In this case, the portable devices are brought into the vehicle by occupants of those seats, and are made available simultaneously for use with the information processing system.

The portable devices installed in the above-described manner provide a sound effect of a piece of music, a movie, a game or the like for the occupants of the vehicle.

The portable devices installed in the above-described manner provide a different sound from different sound sources for each of the occupants.

That is, the portable devices may be controlled so that one of the portable devices for the driver's seat outputs the sound received from the main body of the information processing system while another portable device serving another seat outputs the sound of a piece of music, a movie, a game or the like.

A speaker system of the present invention includes a pair of speakers disposed symmetrically and equidistantly from the axis of symmetry of each of the seats. The speakers disposed in this manner preferably output the virtual sound source.

The speaker system of the portable device may use a processing function such as the stereo dipole method, a theater dimension method, a Dolbey virtual speaker method or the like for outputting the sound from the virtual sound source.

That is, the portable device is equipped with the processing function for real-time sound image localization effect of well-known types, and the processing function controls the output of the sound effect from the portable device based on a sound data processed therein.

The speaker system of the portable device may use pre-processed data for output of the sound effect such as the stereo dipole method, the theater dimension method, the Dolby virtual speaker method or the like.

That is, the data stored in the portable device is used to output the sound effects of well-known types, and the data controls the output of the sound effects from the portable device.

The speaker system of the portable device may output information received from the information processing system. In this manner, various kinds of information are provided for a disposal of the driver or the other occupants of the vehicle without increasing a processing load of the portable device.

The speaker system of the portable device may take surrounding environment into account for preparing output of the sound effect. As sound characteristics such as reflection of the sound in the vehicle change according to a state of the window of the vehicle, i.e., it is open or not, acoustic adjustment such as cross-talk canceling or the like is used to appropriately adjust the output of the sound effect provided by the speaker system of the portable device depending on an installation position or an environment of the portable device.

The sound effect provided by the speaker system of the portable device may be based on sound data received from the information processing system. The processing load of the portable device is decreased because the portable device uses the sound data processed and transferred from the information processing system.

The sound effect provided by the speaker system of the portable device may be based on sound data stored in the portable device. The sound data may be processed in the portable device.

The sound effect may be provided from a buzzer or a speaker system in the information processing system by sending the sound data from the portable device to the information processing system. The sound effect may be processed on the information processing system side.

The sound effect provided by the portable device may be a warning sound, a warning voice, or a guidance voice. For example, the sound effect may be a warning by an electric sound, a voice of warning, a voice of navigation guidance or the like.

The present invention may use virtual sound source for making the sound effect heard in a specific direction. As the virtual sound source makes the output of the sound effect sound in a direction that is determined by the information processing system, the driver of the vehicle or the like can understand which direction he/she should pay attention to. In this manner, safety of driving is improved. In this case, the sound used for the sound effect is a buzzer sound, a melodious sound, a voice or the like.

The sound effect of the sound output may indicate the direction of attention in which the driver's attention is drawn. For example, the sound effect for a guidance voice makes the guidance voice heard in a direction in which the object of the guidance is located.

The direction of attention described above is an example of the direction provided by a navigation system or the like.

The direction of attention may be a direction in which a dangerous matter or an abnormality is detected by the information processing system. The direction of attention described here is an example of the direction determined by information provided by the information processing system.

The direction of attention may be a direction of a detected object when the information processing system notifies the occupants that the vehicle is passing by or approaching an object that may interfere with the vehicle. For example, the driver's attention is drawn by the warning sound or the like in a direction in which the information processing system detects the object in a close surrounding of the vehicle, or the obstacle in a blind spot of the vehicle by using a radar, a sonar, a camera or the like. In this case, the obstacle may be a pedestrian, a bicycle or the like.

The attention of the occupants may be drawn to a door that is in a state of half-shut when the information processing system detects the half-shut door. The sound effect such as the warning sound of an electric sound may sound in a direction where the half-shut door exists.

The attention of the occupants may be drawn to a direction that is determined by information received by an inter-vehicle communication or a vehicle to roadside device communication, or information generated in the navigation system. The attention of the occupants is attracted in the direction described in the above example by using the sound effect or the like.

The speaker system of the portable device may be used for an audible sound output. In this manner, the sound effect of the portable device is improved. The sound effect may be a surround sound effect or the like.

The sound effect for the audible sound output may be produced by the speaker system of the portable device in cooperation with a speaker system installed on the vehicle. In this manner, the sound effect is improved.

The display of the portable device may display a content that is consistent with a content of the sound output from the portable device. In this manner, the occupants of the vehicle can clearly understand or confirm the content of the sound output.

The display of the portable device may display at least one of the following items. That is, a character or a combination of characters indicated by the sound output, a sign indicated by the sound output, or a direction in which the sound effect of the sound output is intended to sound is displayed in the display of the portable device.

In this manner, the occupants of the vehicle clearly understand and/or confirm the content of the sound output. The display may display, for example, a character, a view of the vehicle from either of a top, a front, a side or a rear, a view of the compartment, an arrow sign or the like.

The display of the portable device may display at least one of the following items. That is, a title of a song, an order of the songs, volume of the sound output, or a type of the recording medium.

The above description shows an example of the displayed content. In this manner, the occupants of the vehicle can easily understand information on the song or the like output by the sound output.

The display of the portable device may display at least one of a map for navigation, a guidance information or a coordinate information. In this manner, the display of the portable device used for displaying the navigation information decreases the amount of eye movement compared to the display installed on the vehicle itself, because the portable device may be located closer to a front part of the occupant in each seat.

The navigation function available in the portable device may either be on the portable device or on the information processing system on the vehicle.

The microphone of the portable device may be used to capture a sound in the vehicle for inputting it to the portable device. Therefore, the portable device can control various processes and devices based on the captured sound. That is, the captured sound may be recognized as a command in a voice that controls, for example, an audio system, an air-conditioner or the like.

The sound captured by the microphone of the portable device may be sent from the portable device to the main body of the information processing system as sound information. In this manner, the processing load on the portable device side may be decreased.

The camera of the portable device may be used to capture an image of the occupant of the vehicle for inputting it to the portable device. The captured image, e.g., a driver's image, or information contained therein can be used for controlling various kinds of systems or the like.

The captured image by the camera of the portable device may be used for an adjustment of sound output settings. That is, orientation of the occupant's face is determined based on the captured image, and the settings of the sound output is changed according to the orientation of the occupant's face. Therefore, data for the sound output is processed to reflect the orientation of the occupant's face. In this manner, the sound output, e.g., an intended direction of attention of the sound processed by the sound effect, is correctly understood by the occupant of the vehicle regardless of the orientation of the face.

The data for the sound output may be calibrated by using a coefficient of a sound field that is suitable for the orientation of the occupant's face. An effect of the same sound may be different when the orientation of the occupant's face changes. Therefore, the head-related transfer function (HRTF) used to described sound transfer in the head may be changed according to a situation. That is, the orientation of the face of the occupant is determined based on the captured image for use in an adjustment process of the data of the sound effect. In this manner, the sound output makes the sound heard from an intended direction by adjusting a location of the virtual sound source.

The captured image by the camera of the portable device may be sent to the main body of the information processing system on the vehicle. Therefore, the information processing system can use the captured image for controlling various kinds of systems.

The information processing system may control the display or the sound output of the portable device based on information received thereby. The processing load on the portable device side can be decreased by executing a main part of the processing load to the main body of the information processing system.

The portable device and the information processing system may be equipped with connectors for transferring data through a wired connection. The connector is used to transfer the data between the portable device and the information processing system.

The portable device and the information processing system may be equipped with antennas for transferring data through a wireless connection. The antenna is used to transfer the data between the portable device and the information processing system.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

Figure 1:
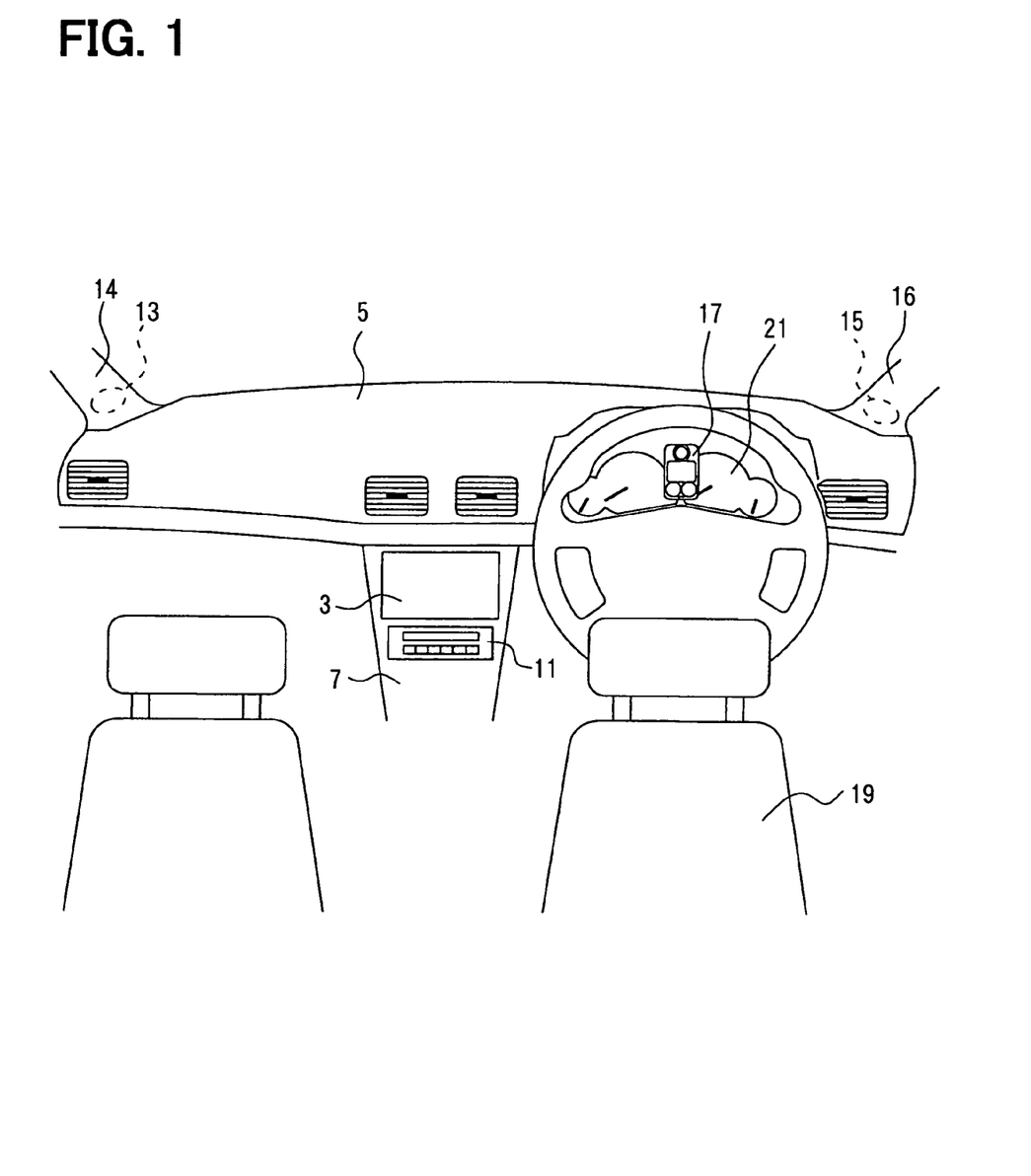
FIG. 1 is an illustrative view of an information processing system in a first embodiment of the present invention.

An information processing system in a first embodiment is explained with reference to FIG. 1. In FIG. 1, a portable device 17 of the information processing system is installed on an instrument panel 21 on a dashboard 5.

As shown in FIG. 1, an automotive system in a form of a navigation system 1 (shown in FIG. 5) is disposed on a vehicle with its display 3 for displaying an image such as a map or the like installed in a center portion 7 hanging at a center of the dashboard 5 in the vehicle.

An audio system 9 (shown in FIG. 5) includes an operation panel 11 installed under the display 3 and speakers 13, 15 installed in front pillars 14, 16 positioned on a right and left in a front space of a driver or the like.

Figure 11:
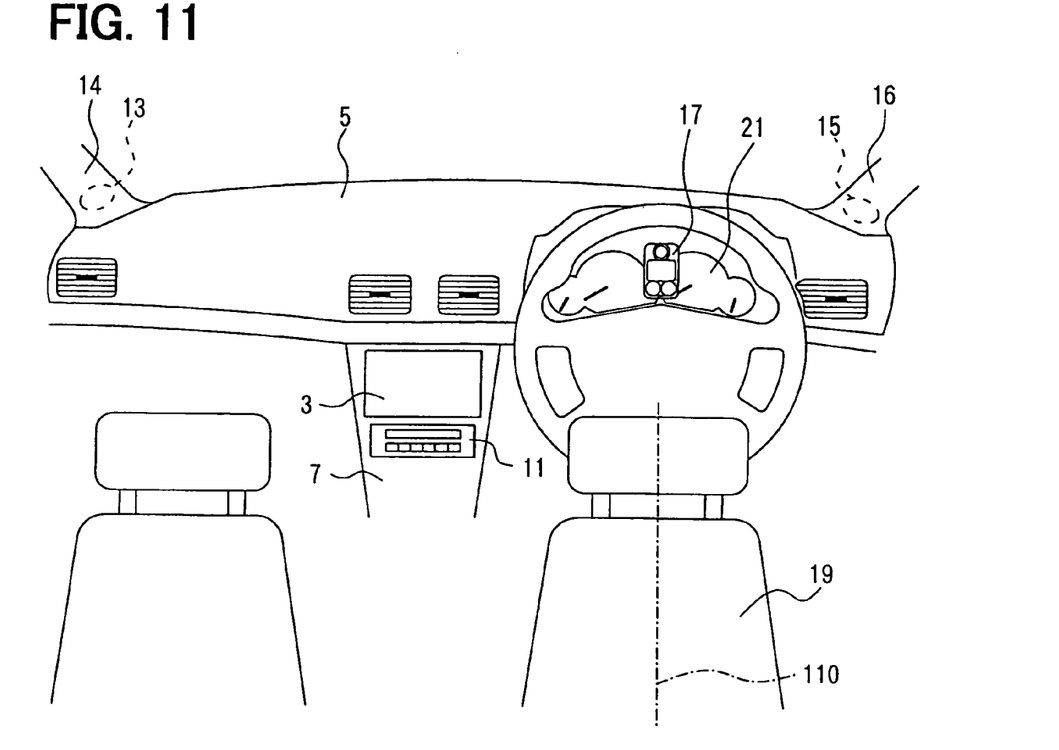
FIG. 11 is an illustrative view of a positional relationship between the portable device and a driver's seat.

The portable device 17 for processing various kinds of information that can be held by the driver or the like is installed on the instrument panel 21 on the dashboard 5 in a front space of a driver's seat 19. More practically, the portable device 17 is positioned with an axis of symmetry, i.e., broken lines 111, 112 in FIGS. 12A, 12B, aligned with an extension of an axis of symmetry 110 of the driver's seat 19 as shown in FIG. 11.

Figure 2A:
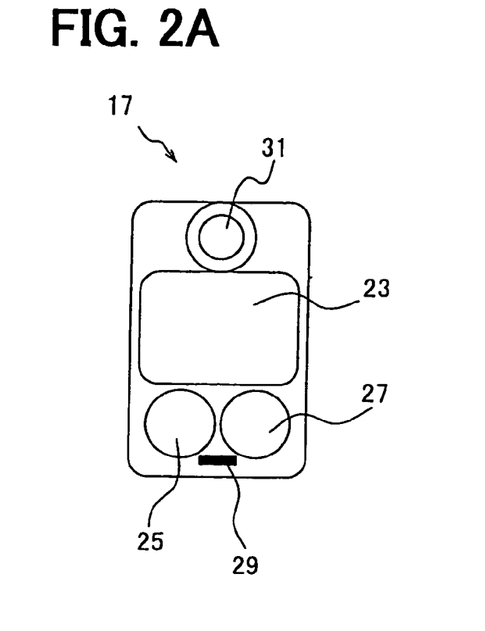
FIG. 2A is a front face of a portable device in the first embodiment.
Figure 2B:
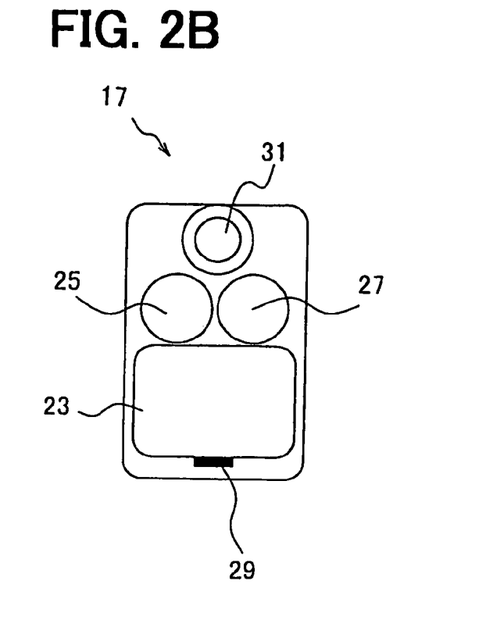
FIG. 2B is a modified front face of the portable device shown in FIG. 2A.

The portable device 17 includes a display 23, a pair of speakers 25, 27 under the display, a microphone 29 in a proximity under a center of the speakers 25, 27 and a camera 31 in a proximity above the display 23 on a driver's side (i.e., driver's seat side) face formed in a symmetrical shape as shown in FIG. 2A. That is, above-described parts 17, 23, 25, 27, 29, and 31 are disposed on a same side of the portable device 17. An arrangement of the parts 17, 23, 25, 27, 29, and 31 may be changed in a way as shown in FIG. 2B.

Figure 12A:
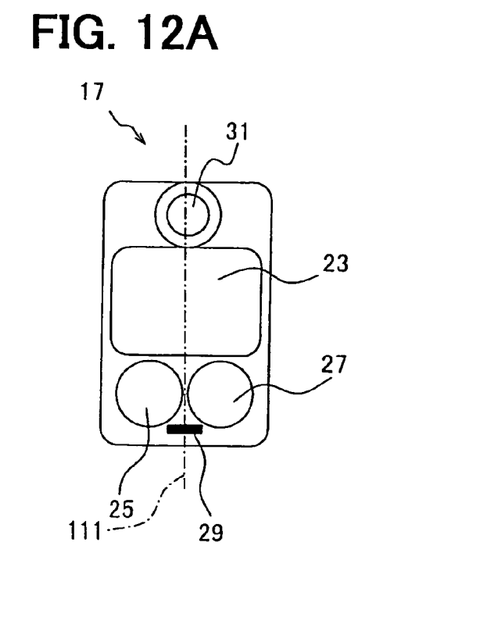
FIG. 12A is an illustrative view of the portable device in FIG. 2A shown with its axis of symmetry.
Figure 12B:
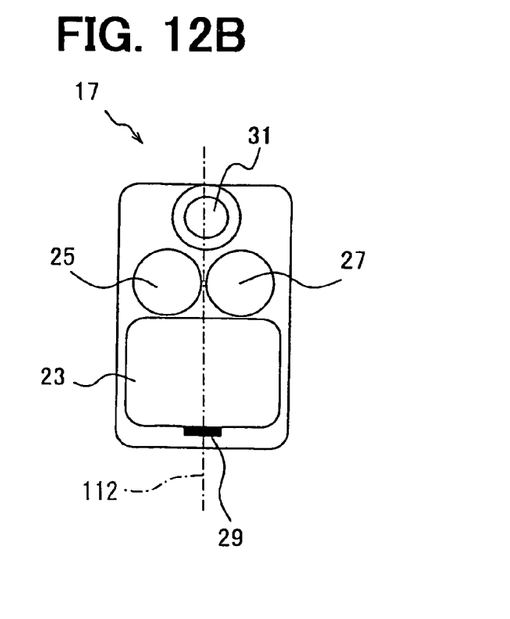
FIG. 12B is an illustrative view of the portable device in FIG. 2B shown with its axis of symmetry.

The speakers 25, 27 of the portable device 17 are horizontally positioned when the portable device 17 is installed on the instrument panel 21 with its axis of symmetry aligned with the axis of symmetry of the driver's seat 19. The speakers 25, 27 are positioned laterally equidistantly from the axis of symmetry of the portable device 17. The axis of symmetry of the driver's seat extends over the microphone 29, the camera 31 and a longitudinal center line of the display 23 as shown in FIGS. 12A and 12B.

Figure 3A:
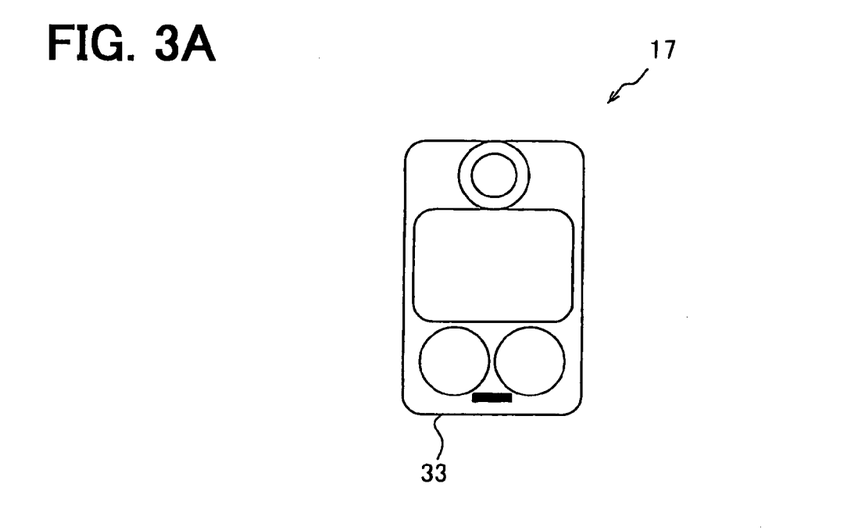
FIG. 3A is the front face of the portable device in the first embodiment.
Figure 3B:
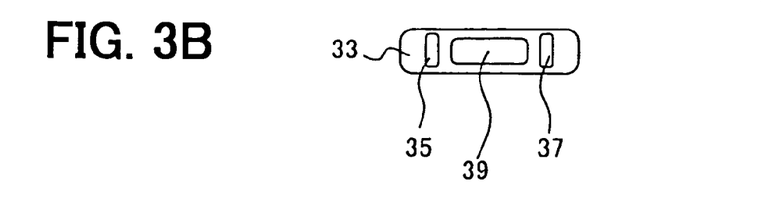
FIG. 3B is a bottom view of the portable device shown in FIG. 3A.

The portable device 17 has a pair of terminals 35, 37 and an additional terminal 39 (not shown in the figure) covered by a covering at a bottom 33 as shown in FIG. 3B.

Figure 4A:
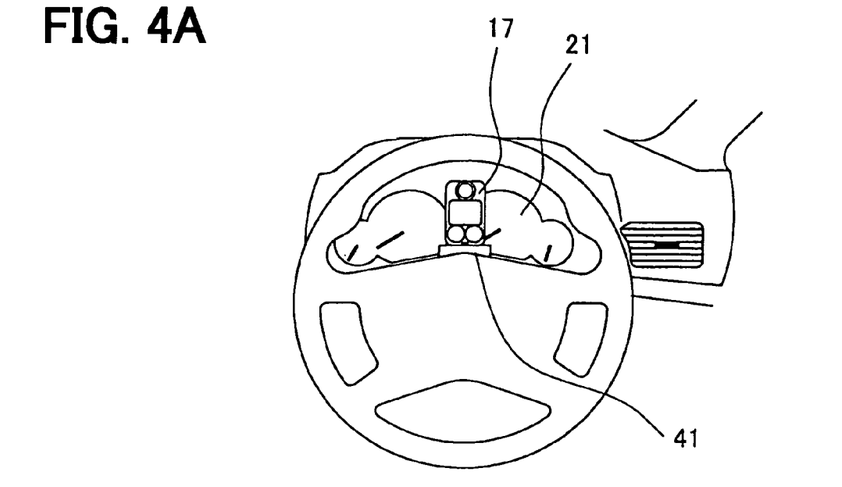
FIG. 4A is an illustrative view of the portable device installed on an instrument panel in the first embodiment.
Figure 4B:
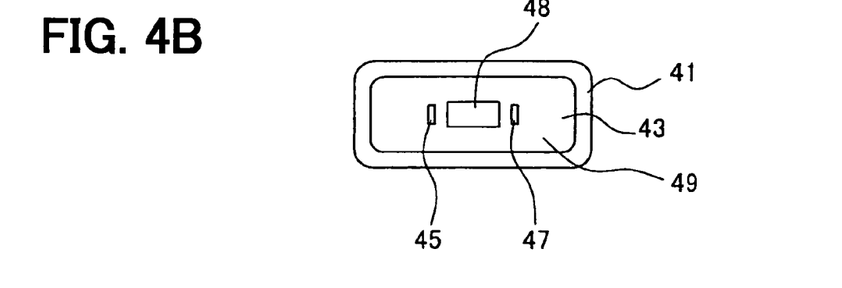
FIG. 4B is a bottom view of the portable device shown in FIG. 4A.

A receptacle 41 of the portable device 17 having a concave portion 49 with an opening on its upper side is disposed at a center of the instrument panel 21 for quick connect and disconnect as shown in FIG. 4A.

The receptacle 41 includes a pair of terminals 45, 47 at a bottom 43 to be contacted by the terminals 35, 37 on the portable device 17. The receptacle 41 also includes an additional terminal (not shown in the figure) covered by a covering 48 that corresponds to the additional terminal 39 on the portable device 17.

Figure 5:
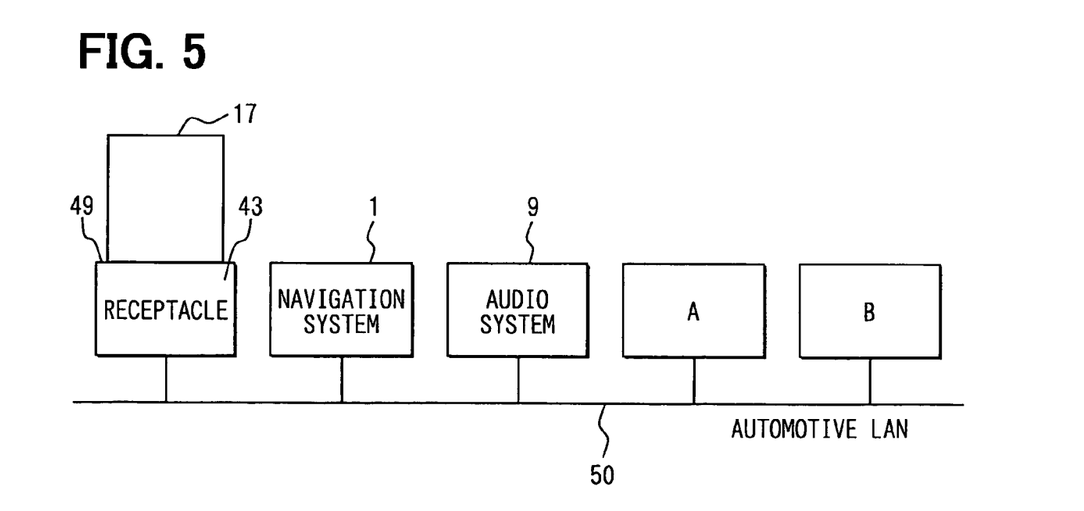
FIG. 5 is a schematic drawing of a communication circuit and the like in the information processing system.

The portable device 17 and the receptacle 41 are electrically coupled by the terminals 35, 37, 45, 47 when the portable device 17 is placed in the concave portion 49 of the receptacle 41 as shown in FIG. 5. In this manner, the portable device 17 and the automotive systems such as the navigation system 1, the audio system 9 or the like installed on the vehicle are coupled for information exchange through an automotive LAN 50.

For example, the navigation system 1 may send a map information through the automotive LAN 50 by an electric control unit (ECU, not shown in the figure) to the portable device 17 for displaying the map information on the display 23. The navigation system 1 may also send a coordinate information to the portable device 17 for displaying a current location of the vehicle or the like on the display 23.

The audio system 9 may send an audio signal to the portable device 17 through the automotive LAN 50 by an audio ECU (not shown in the figure) for outputting an audio output or playing a piece of music.

The portable device 17 may play the audio signal stored therein by itself. The portable device 17 may also send the audio signal to, for example, the audio ECU through the automotive LAN 50 for outputting it from the speakers 13, 15 on the vehicle.

The portable device 17 may simultaneously receive names of the pieces of the music, order of the pieces of the music or the like from the audio ECU for displaying it on the display 23.

The portable device 17 is further explained in detail in terms of its structure or the like.

The display 23 of the portable device 17 includes a liquid crystal, an electro-luminescence or the like in a small package. The display 23 faces the driver in a right front. Therefore, the driver can minimize his/her eye movement when he/she looks at an image on the display 23 for confirming a landmark upon hearing guidance of the navigation system 1 at, for example, an intersection, because the display 23 is installed at a center of the instrument panel 21. In this manner, the eye movement for confirming the display 23 resembles the eye movement for confirming the instrument panel 21, and thus inattentiveness in driving because of a confirmation of a navigation guidance is prevented.

The speakers 25, 27 in the portable device 17 are small and thin in size and are used for outputting a warning sound, an alarm or an audio output.

The portable device 17 is equipped with a processing function for outputting a virtual sound effect created by a stereo dipole method, a theater dimensional method, a Dolbey prologic method or the like by using a few speakers. That is, the portable device 17 has a sound image localization function for controlling a sound image (refer to Japanese Patent Document JP-A-H11-318000).

Therefore, the portable device 17 can make a sound such as a warning, a voice or the like output from a virtual sound source. That is, the sound is heard in a direction determined by the automotive system such as an object detection system, an abnormality detection system or the like in which no speaker exists.

For example, an object detected by ultrasound sonar of the object detection system disposed on the four corners and front/rear bumpers of the vehicle may be notified to the driver by outputting the warning sound from the virtual sound source in the direction of the detected object.

Another example may be a position of an emergency vehicle such as an ambulance warned by a warning sound output in a direction in which the ambulance is approaching based on a positional information received from, for example, Vehicle Information and Communication System (VICS) through a vehicle to roadside device communication.

The positional information of the emergency vehicle or the like may be transferred to other vehicles through an emergency sensor and a roadside antenna.

A half-shut door may be warned by the warning sound heard in a direction of the door.

A voice of a cellular phone may be heard in a direction of a passenger seat. In this manner, talking to a cellular phone simulates talking with an occupant in the passenger seat. The voice of the cellular phone may be heard from a front space of the driver for avoiding confusion when there is an occupant in the passenger seat. The occupant may be detected by using a seat sensor or the like.

A pedestrian or a bicycle detected by a field watch system may be warned by the warning sound heard in a direction in which the pedestrian or the bicycle is existing.

Sound effect data used in the stereo dipole method, the theater dimensional method, the Dolbey prologic method or the like may be prepared in advance for use in creating the virtual sound source and may be readily output as an effect in a sound or a voice heard in a direction of attention. The sound effect data may be stored either in the portable device 17 or in the automotive system.

The sound effect in the above-described methods may improve a surround effect in the sound. In this case, the sound effect may be processed in real-time in the portable device 17 or may be produced from a pre-processed data stored either in the portable device 17 or the automotive system.

A conventional stereo dipole speaker method in the vehicle (disclosed in Japanese Patent Document JP-A-H11-318000) uses a speaker fixed in the vehicle, but the portable device 17 may be moved in the vehicle. In this case, the portable device 17 may take a location of the device 17 in the vehicle into account in terms of reflection by an object such as a glass or the like, and absorption by an object such as a seat or the like. That is, the sound image may be adjusted by using a coefficient according to an installation position of the portable device 17. The portable device 17 may use a pre-processed coefficient stored in the device 17 that is suitable for the installation position.

The portable device 17 may adjust the sound effect by using a method that takes a so-called cross talk into account disclosed, for example, in an article "Sound system and digital signal processing" by Ohga et al. published by Institute of Electronics, Information and Communication Engineers.

The camera 31 uses a CCD, a CMOS or the like as an image capture element. The camera 31 is used for capturing a face of the driver, orientation of the face, an expression on the face, line of sight, frequency of blinking or the like. The portable device 17 may send the captured image to the automotive system as a face data to be utilized as a parameter for controlling the system.

For example, the sound image may be processed by using a coefficient suitable for the orientation of the driver's face to create an optimized virtual sound source. A Head-related transfer function (HRTF) of well-known type may be utilized for providing the optimized virtual sound source by selecting the coefficient of the sound image (disclosed in Japanese Patent Document JP-A-H11-318000).

In this case, frequency of image capturing by the camera 31 or the like may be determined based on a request from the automotive system 50 or based on data in the portable device 17.

The microphone 29 is small and thin in size and is used for inputting sound. The microphone 29 captures a voice of the driver, and the portable device 17 sends the voice to the automotive system for an analysis by, for example, a voice recognition system. In this manner, the voice of the driver may be used to control a system, that is, for setting a destination of navigation, for adjusting an air-conditioner or the like.

As the portable device 17 in the first embodiment is installed right in front of the driver, and the display 23 of the portable device 17 displays necessary information for the driver, the driver can get the necessary information without looking at a display 3 installed at the center of the dashboard 5. Therefore, safety in driving is greatly improved because of the readiness of the necessary information.

Further, as the portable device 17 is installed in front of the driver for making a sound or a voice heard in the direction of attention by creating the virtual sound source, the driver can quickly and accurately understand a current situation of driving. That is, a sound or a voice may be output from the virtual sound source created by the sound effect in a direction based on detection signals from, for example, various kinds of sensors. Therefore, safety in driving is greatly improved because of the readiness of the necessary information served by using the virtual sound source.

Furthermore, as the display 23 complements the sound and/or the voice (the warning or the guidance) from the speakers 25, 27 and/or a buzzer by visually displaying a consistent image with the sound such as a character, a sign, an arrow or the like, safety in driving is further improved. Contents of the displayed image may include a text, a view of the vehicle from a top, a front, a side or a rear, a view of the compartment, or an arrow sign or the like.

Furthermore, the audio output such as the sound or the voice may be output from the speakers 25, 27 on the portable device 17 alone, or may be output from the speakers including the speakers 13, 15 of the audio system 9. The audio output may be accompanied by representation of, for example, names of the pieces of music, order of the pieces of music, volume of the sound, recoding medium or the like displayed on the display 23.

Furthermore, the map information or the like received from the navigation system 1 may be output to the speakers 25, 27 or the display 23 of the portable device 17. The portable device 17 may have a function of the navigation system 1.

Second Embodiment

A second embodiment of the present invention is explained with reference to FIGS. 6, 7, and 8.

Figure 6:
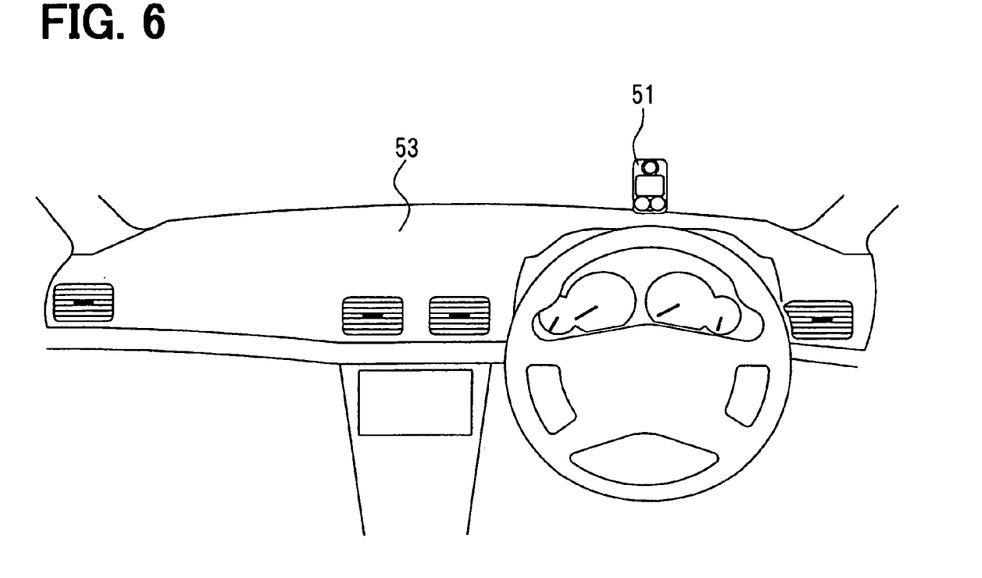
FIG. 6 is an illustrative view of the information processing system in a second embodiment.

As shown in FIG. 6, the portable device 51 may be installed on a dashboard 53 in a front space of the driver's seat (not shown in the figure). More practically, the portable device 51 in a right front of the driver has the axis of symmetry aligned with an extension of the axis of the symmetry of the driver's seat. In this manner, the portable device 51 further decreases the eye movement.

Figure 7:
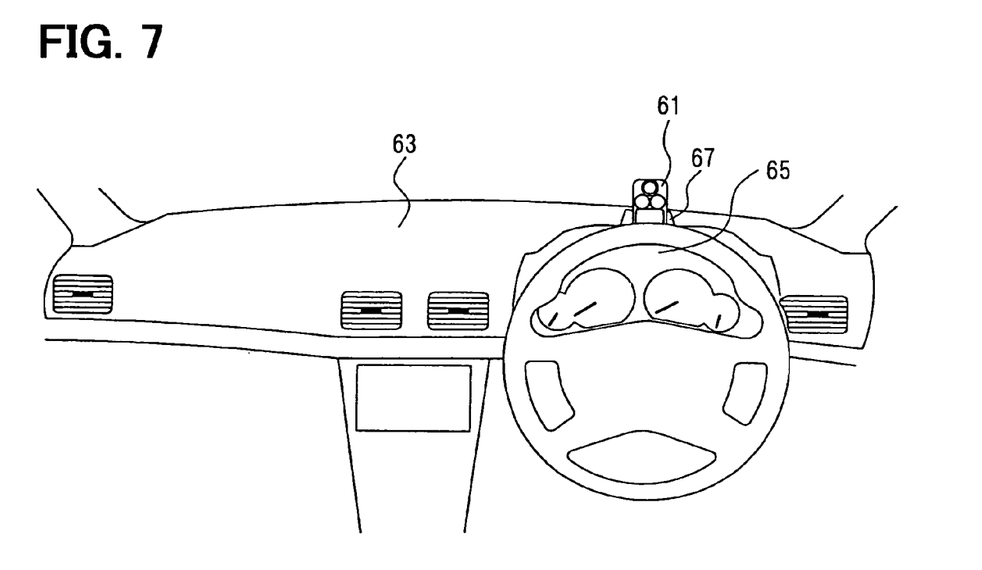
FIG. 7 is an illustrative view of the information processing system in a first modified form of the second embodiment.

As shown in FIG. 7, the portable device 61 may be installed in a pocket 67 above an instrument panel 65 on a dashboard 63. The axis of symmetry of the portable device 61 installed in a right front of the driver is also aligned with the axis of symmetry of the driver's seat in this case.

Figure 8:
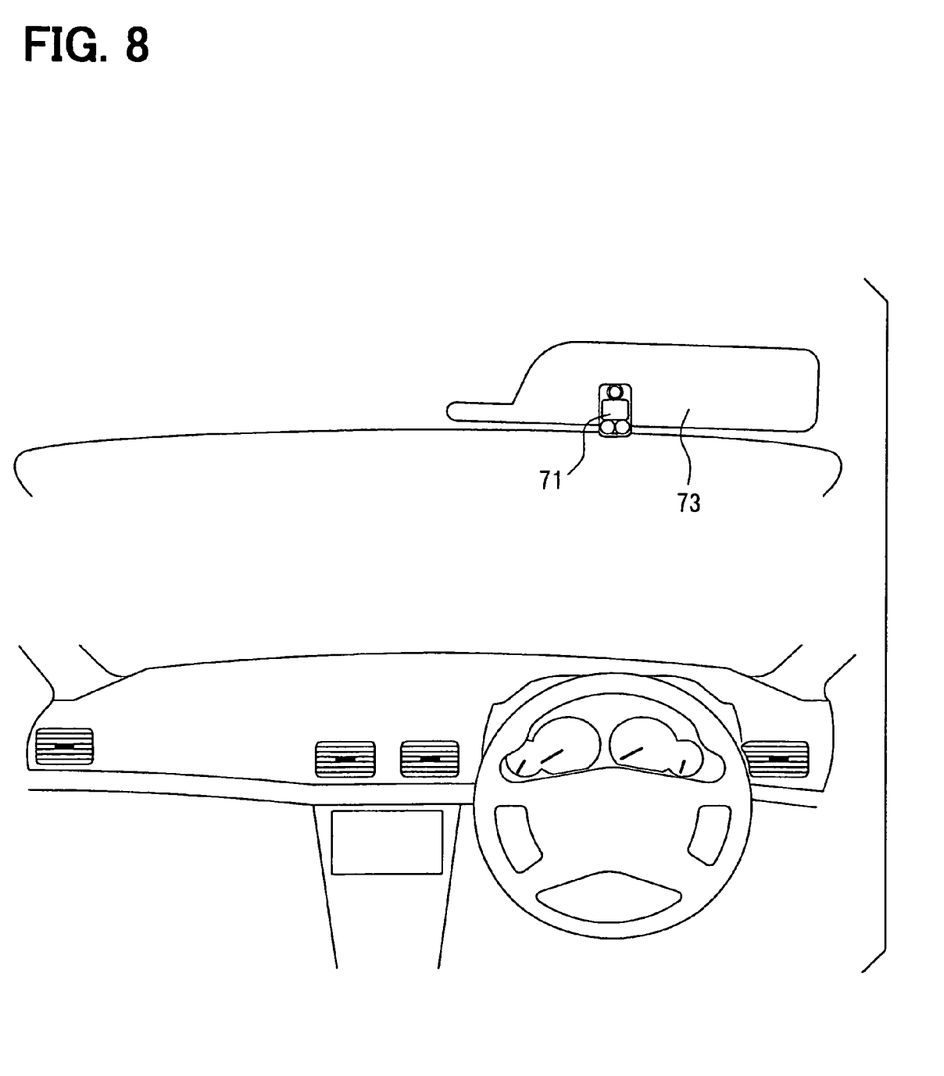
FIG. 8 is an illustrative view of the information processing system in a second modified form of the second embodiment.

As shown in FIG. 8, the portable device 71 may be installed on a lower end of a visor 73 in front of the driver's seat. The axis of symmetry of the portable device 71 installed in a right front of the driver is also aligned with the axis of symmetry of the driver's seat in this case.

The portable device 71 may be installed at a position in a right front of the driver with the axis of symmetry aligned with an extension of the axis of symmetry of the driver's seat. That is, the portable device 71 may be installed at a top of a steering column or in a proximity of the driver's knee. The portable device 71 may only be used for creating the virtual sound source when it is installed in the proximity of the driver's knee or the like. It is because the eye movement to the position is greater than the eye movement to the instrument panel, and that makes it difficult to be used as a display device.

Third Embodiment

Figure 13:
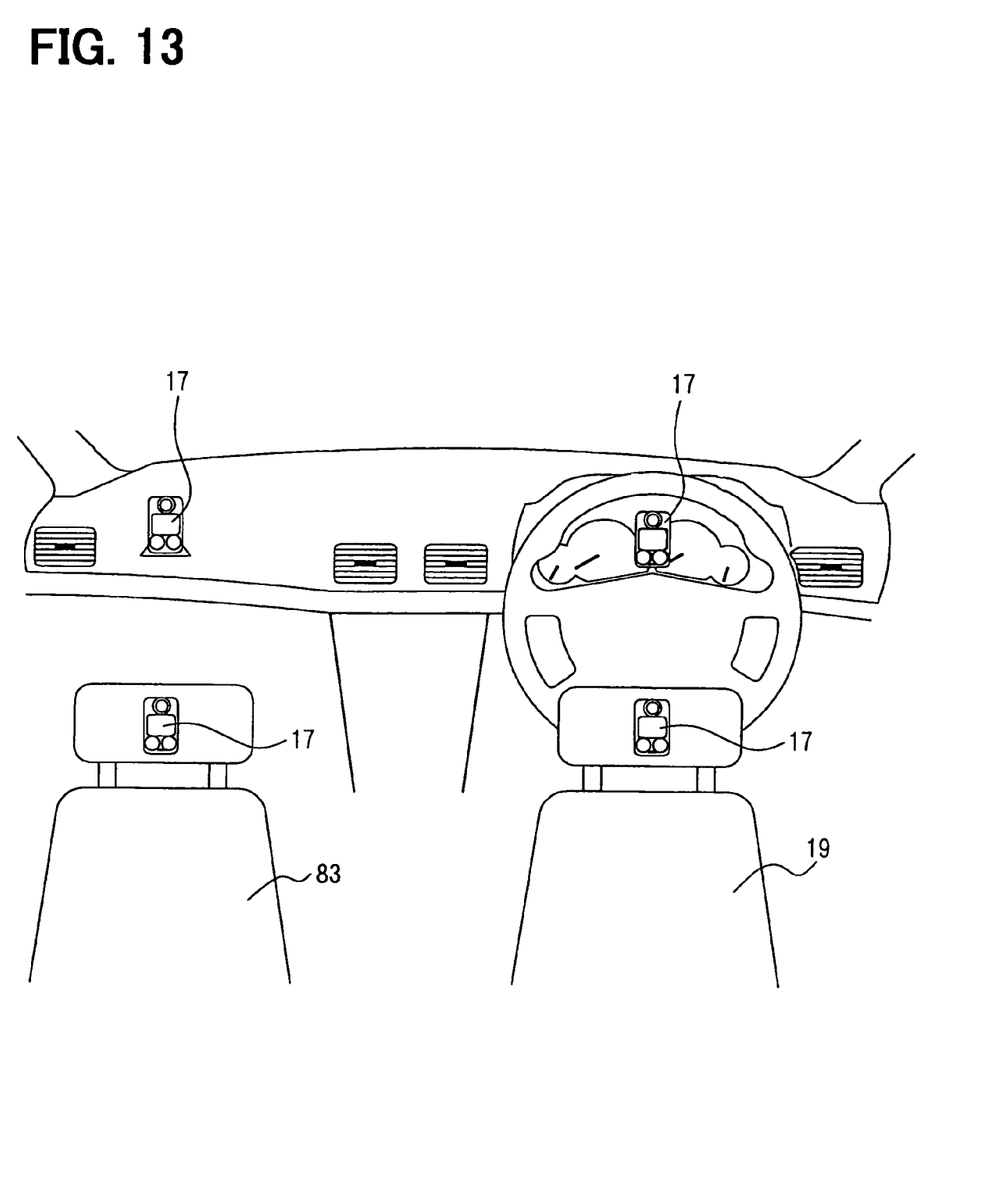
FIG. 13 is an illustrative view of positions of the portable devices in the third embodiment.
Figure 14:
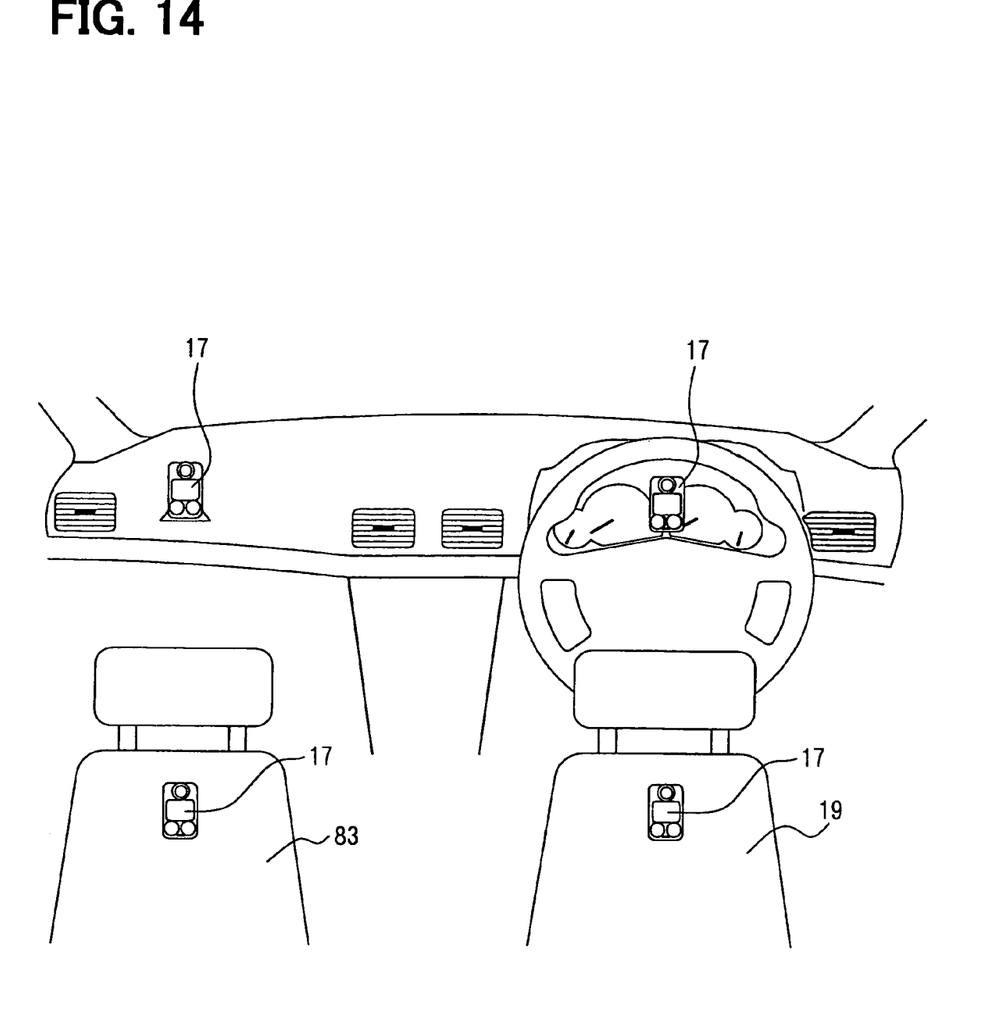
FIG. 14 is another illustrative view of positions of the portable devices in the third embodiment.

A third embodiment of the present invention is explained with reference to FIGS. 9, 13 and 14.

Figure 9:
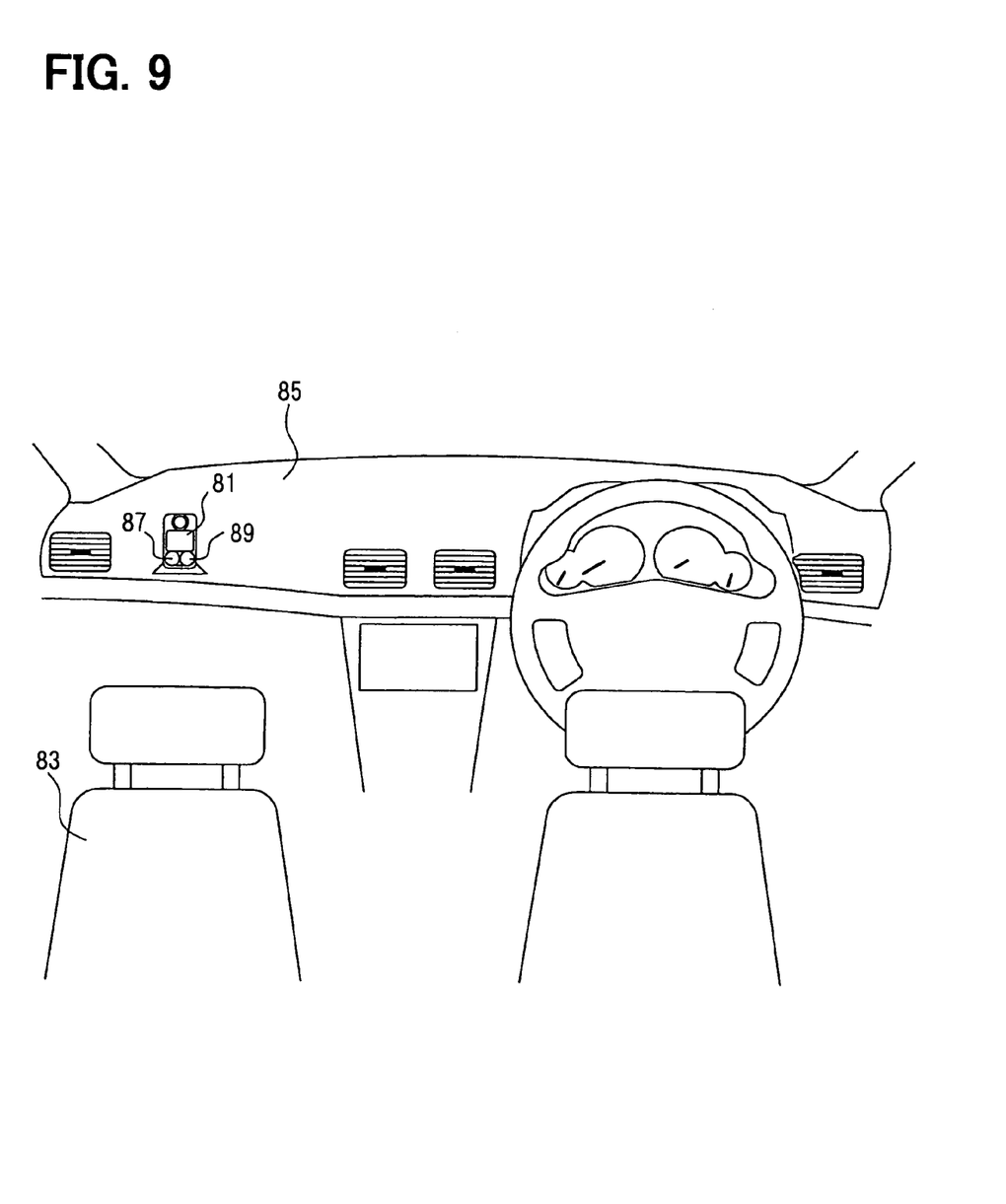
FIG. 9 is an illustrative view of the information processing system in a third embodiment.

As shown in FIG. 9, the portable device 81 is installed on a dashboard 85 in a front space of the passenger seat 83. More practically, the portable device 81 has the axis of symmetry aligned with an extension of the axis of the symmetry of the passenger seat 83. In this manner, the portable device 81 provides necessary information through the sound and/or the voice by creating the virtual sound source with the speakers 87, 89 to the occupant of the passenger seat 83. The display 91 of the portable device 81 displays necessary information as a visual representation.

The portable device may be installed in front of the seats in a second row and the third row. That is, the portable devices may be installed on backs or on headrests of the driver's seat, the passenger seat, a left seat and a right seat in the second row as shown in FIGS. 13 and 14. In this case, each of the portable devices has the axis of symmetry aligned with the axis of symmetry of each of those seats.

In this manner, the portable device 17 brought into the compartment may be used at each installation point simultaneously. The portable device 17 may be used for outputting a piece of music, a sound effect of a movie, a sound effect of a game or the like.

The portable device 17 installed in front of the driver's seat may output information received from the automotive system in a sound output by prioritizing the sound output of the information over the sound of the music or the like when other occupants enjoy the sound effect of the movie or the like simultaneously. This is achieved by adjusting the sound output of each portable device separately.

Fourth Embodiment

A fourth embodiment of the present invention is explained with reference to FIG. 10.

Figure 10:
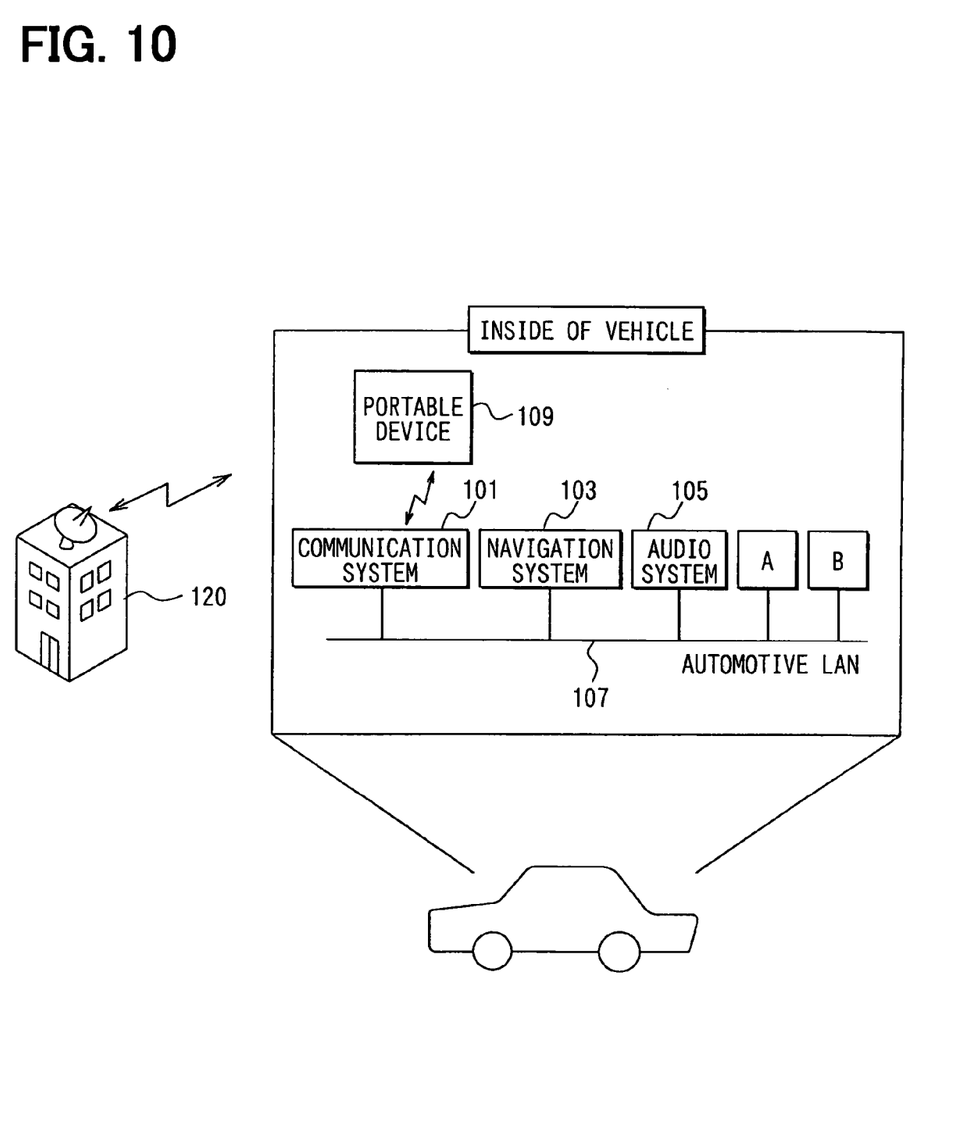
FIG. 10 is a schematic drawing of a system structure of the information processing system in a fourth embodiment.

As shown in FIG. 10, a wireless communication system 101, a navigation system 103, an audio system 105 and the like in the compartment of the vehicle are connected to an automotive LAN 107, and the portable device 109 with an antenna communicates with the wireless communication system 101 for sending and receiving information. The portable device 109 may be installed at positions described in the above embodiments.

A communication station 120 and an external communication system (not shown in the figure) on the vehicle communicate with each other for retrieving necessary information and displaying it on the portable device 109 for the driver or other occupants.

For example, a map information of the navigation system 103 may be transferred to the portable device 109 through communication between the external communication system and the communication station 120 to be displayed on a display of the portable device 109. Further, a coordinate information may be transferred to the portable device 109 for displaying a position of the vehicle or the like. Further, a positional information of the emergency vehicle may be transferred to the portable device 109 for displaying the position of the emergency vehicle or the like and/or for outputting the sound or the like.

The output of the image or the sound may be based on an inter-vehicle communication instead of the vehicle to roadside device communication.

In this embodiment, the portable device 109 may provide information from an external source for the driver and other occupants in addition to an effect of the first embodiment.

Although the present invention has been fully described in connection with the preferred embodiments thereof with reference to the accompanying drawings, it is to be noted that various changes and modifications will become apparent to those skilled in the art.

For example, the portable device may include only the display, only the speaker, or only the display and the speaker among other parts. The camera and the microphone may further be included in the portable device.

Such changes and modifications are to be understood as being within the scope of the present invention as defined by the appended claims.

What is claimed is:

1. An information processing system comprising:
   a main body installed on a vehicle for various operations; and
   a portable device in data communication with the main body for data exchange,
   wherein the portable device is disposed in the vehicle with an axis of symmetry substantially aligned with an extension of an axis of symmetry of a seat, and
   the portable device has a speaker system equipped to output an audible signal from a virtually created source.

2. An information processing system comprising:
   a main body installed on a vehicle for various operations; and
   a portable device in data communication with the main body for data exchange,
   wherein the portable device is disposed in the vehicle with an axis of symmetry substantially aligned with an extension of an axis of symmetry of a seat, and
   the portable device has a speaker system equipped to output an audible signal from a virtually created source and to display an image signal.

3. The information processing system of claim 1,
   wherein the portable device and the main body are coupled by one of a wired communication and a wireless communication for data communication.

4. The information processing system of claim 2 further comprising,
   at least one of a camera for capturing an image and a microphone for capturing a sound.

5. The information processing system of claim 4,
   wherein the portable device has an operator side face that is equipped with at least one of an audible signal output portion of the speaker system, an image signal output portion of a display, an image input portion of the camera and an audible signal input portion of the microphone.

6. The information processing system of claim 1,
   wherein the seat includes at least one of a driver's seat, a passenger seat, a second row driver side seat, a second row passenger side seat, a third row driver side seat and a third row passenger side seat.

7. The information processing system of claim 1,
   wherein the portable device is installed in at least one of an instrument panel, a dashboard above the instrument panel, a top of a steering column, a visor, a headrest of the seat and a back of the seat.

8. The information processing system of claim 1,
   wherein a plurality of the portable devices are installed for use in the driver's seat, the passenger seat, the second row driver side seat, the second row passenger side seat, the third row driver side seat and the third row passenger side seat, with the axis of symmetry of each of the plurality of the portable devices aligned with the extension of the axis of symmetry of each seat for which the portable device serves.

9. The information processing system of claim 8,
   wherein the audible signal serves for facilitating awareness of the surrounding environment of the vehicle.

10. The information processing system of claim 8, wherein the audible signal includes at least one of a music recording, a movie recording and a video game.

11. The information processing system of claim 8, wherein at least one of the plurality of the portable devices is equipped to output the audible signal that is distinct from the audible signal from the other portable devices for facilitating the awareness of the surrounding environment.

12. The information processing system of claim 1, wherein the speaker system includes a pair of speakers horizontally equidistantly positioned from the extension of the axis of symmetry of the seat.

13. The information processing system of claim 12, wherein the portable device outputs the audible signal from the virtually created source by processing the audible signal with a method including a stereo dipole method, a theater dimension method, a Dolbey virtual speaker method and a similar method.

14. The information processing system of claim 12, wherein the portable device outputs the audible signal from the virtually created source by modifying the audible signal using a preprocessed data with the method including the stereo dipole method, the theater dimension method, the Dolbey virtual speaker method and the similar method.

15. The information processing system of claim 1, wherein the speaker system of the portable device outputs the audible signal based on transferred information from the main body.

16. The information processing system of claim 1, wherein the speaker system of the portable device outputs the audible signal having a suitable sound field characteristic of a position of installation and the surrounding environment.

17. The information processing system of claim 1, wherein the speaker system of the portable device outputs the audible signal modified by a transferred data from the main body.

18. The information processing system of claim 1, wherein the speaker system of the portable device outputs the audible signal modified by a data stored in the portable device.

19. The information processing system of claim 1, wherein the portable device outputs data of the audible signal from at least one of a speaker system and a buzzer on the main body after transferring the data stored in the portable device to the main body.

20. The information processing system of claim 1, wherein the audible signal of the portable device includes at least one of a sound of warning, a voice of warning and a voice of guidance.

21. The information processing system of claim 20, wherein the audible signal output comes from the virtually created source in a direction in which a focus of attention exists.

22. The information processing system of claim 21, wherein the focus of attention exists in a direction that is consistent with the voice of guidance.

23. The information processing system of claim 21, wherein the focus of attention is determined in the main body by a means that evaluates a condition regarding the vehicle and the surrounding environment.

24. The information processing system of claim 21, wherein the focus of attention includes at least one of an object interfering with the vehicle, an approaching object towards the vehicle and a blind spot of the vehicle in a proximity of an object.

25. The information processing system of claim 21, wherein the focus of attention includes a half-shut door.

26. The information processing system of claim 21, wherein the focus of attention includes a matter determined by at least one of an external information from a vehicle to roadside device communication, an external information from an inter-vehicle communication and a guidance information from a navigation system.

27. The information processing system of claim 1, wherein the speaker system of the portable device outputs the audible signal.

28. The information processing system of claim 1, wherein the portable device outputs the audible signal in cooperation with an audio system on the main body.

29. The information processing system of claim 3, wherein the display displays a content having consistency with the audible signal outputted from the portable device.

30. The information processing system of claim 29, wherein the content includes at least one of a character, a sign, and the virtually created source.

31. The information processing system of claim 29, wherein the content includes at least one of a title of a music piece, an order of the music piece, a volume of the audible signal and a type of medium storing the data.

32. The information processing system of claim 2, wherein the content includes at least one of a map, a guidance information and a coordinate information which is generated in the navigation system.

33. The information processing system of claim 32, wherein the navigation system operates on either of the main body or the portable device.

34. The information processing system of claim 4, wherein the portable device captures a sound in the vehicle by the microphone.

35. The information processing system of claim 34, wherein the portable device transfers data of the sound to the main body.

36. The information processing system of claim 4, wherein the portable device captures an image of an occupant of the vehicle.

37. The information processing system of claim 36, wherein the audible signal from the speaker system reflects an orientation of a face of the occupant.

38. The information processing system of claim 37, wherein the audible signal is processed based on a coefficient of the sound field characteristic having consistency with the orientation.

39. The information processing system of claim 36, wherein the portable device transfers a data of the image captured by the camera to the main body.

40. The information processing system of claim 39, wherein the main body determines an output of the audible signal and/or the data from the portable device based on the data transferred from the portable device.

41. The information processing system of claim 1, wherein the portable device and the main body are equipped with a connector for the wired communication.

42. The information processing system of claim 1, wherein the portable device is equipped with an antenna for the wireless communication.

* * * * *